US006028757A

United States Patent [19]

Hartinger et al.

[11] Patent Number: 6,028,757

[45] Date of Patent: Feb. 22, 2000

[54] PROCESS FOR ADJUSTING A THERMAL OVERLOAD CUT-OUT

[75] Inventors: Peter Hartinger, Bodenwöhr; Frank Scholle; Paul Wied, both of Kümmersbruck, all of Germany

[73] Assignee: Siemens AG, Munich, Germany

[21] Appl. No.: 09/180,682

[22] PCT Filed: Apr. 30, 1998

[86] PCT No.: PCT/DE97/00891

§ 371 Date: May 20, 1999

§ 102(e) Date: May 20, 1999

[87] PCT Pub. No.: WO97/43779

PCT Pub. Date: Nov. 20, 1997

[30] Foreign Application Priority Data

May 13, 1996 [DE] Germany .......................... 196 19 295

[51] Int. Cl.$^{7}$ ........................................ H02H 5/04

[52] U.S. Cl. .......................... 361/105; 361/93.8; 337/82

[58] Field of Search .................................... 361/103, 105, 361/93.1, 93.8, 32, 94; 337/16, 68, 82, 88–89, 333, 365, 380

[56] References Cited

U.S. PATENT DOCUMENTS

| | | | |
|---|---|---|---|
| 3,700,964 | 10/1972 | Moore | 361/32 |
| 5,825,273 | 10/1998 | Roger | 337/49 |

FOREIGN PATENT DOCUMENTS

| | | |
|---|---|---|
| 2 536 906 | 6/1984 | France . |
| 2 667 979 | 4/1992 | France . |
| 34 01 901 | 8/1985 | Germany . |
| 39 17 327 | 11/1990 | Germany . |
| 342629 | 1/1960 | Switzerland . |
| WO 86/02197 | 4/1986 | WIPO . |

*Primary Examiner*—Michael J. Sherry
*Attorney, Agent, or Firm*—Kenyon & Kenyon

[57] ABSTRACT

In a the method for adjusting thermal overload cutouts, after a synchronization of bimetallic strips and optionally a pre-adjustment of a cutout mechanism, the bimetallic strips are acted upon by current for a specific time, at the end of which the actual adjustment procedure takes place. In this, a residual cutout distance still remaining between the bimetallic strips and a mechanical shutoff point is reduced by zero by an apparatus. This adjustment method eliminates repeat testing with time-consuming cooldowns.

4 Claims, 2 Drawing Sheets

PROCESS FOR ADJUSTING A THERMAL OVERLOAD CUT-OUT

FIELD OF THE INVENTION

The present invention refers to a method for adjusting thermal.

BACKGROUND INFORMATION

French Patent No. 2 667 979 describes a method for adjusting a thermal overload cutout having bimetallic strips, a pickoff system, and a cutout mechanism which has an adjustment device. The position of the bimetallic strips is first matched to the pickoff system, and a preadjustment of the cutout mechanism is performed by setting a predefined cutout distance, the bimetallic strips are then acted upon by a specific current.

Adjustment methods and thermal overload cutouts of this kind are already known. Protective devices having delayed-action overload cutouts of this kind must, according to specifications, cut out within specific response limits (e.g. International Electratechnical Commission IEC 947-2, IEC 947-4-1). According to these specifications, a cutout must occur within 2 hours under a load equal to 1.2 times the preset current, and no cutout must occur within 2 hours of current application with 1.05 times the preset current. In devices having thermal overload cutouts, this is usually achieved by converting the current, via the electric heat, into a deflection of bimetallic strips, and adjusting to these bimetallic strips a mechanical system which contains a kickover function.

The effective deflection of the bimetallic strips depends on a variety of influencing factors, for example the current path resistance of the thermal overload cutout, the specific deflection of the bimetallic strips, the cutout force and resilience of the mechanical system, etc. Individual deflections thus exist for each protective device.

FIG. 2 shows a schematic sketch of a conventional thermal overload cutout. It contains three bimetallic strips 1, a mechanical pickoff system 2, and a cutout mechanism 3 having a compensation strip and an adjusting device 5. In the conventional adjustment method, it is assumed that protective devices of uniform design have an average effective deflection. This deflection travel is set as the distance y between the bimetallic strips and the mechanical shutoff point of the cutout mechanism (preadjustment), and the position of the bimetallic strips is then matched to the pickoff system (synchronization). The cutout time of the thermal overload cutout at a specific current is then measured. If the cutout time falls outside a predefined time window determined by the current response limits, the distance must be corrected based on the time deviation. The cutout time measurement is repeated after the protective device has cooled to ambient temperature.

In order to ensure that response limits are within specifications, randomly sampled measurements of the response limits are made. If the results show a trend toward a change in the response limits, the latter are corrected toward the middle of the specified response limits by shifting the time window when the cutout time is checked.

SUMMARY OF THE INVENTION

The present invention relates to adjusting thermal overload cutouts. The thermal overload cutouts include bimetallic strips, a pickoff system and a cutout mechanism which has an adjustment device. A position of the bimetallic strips first is matched to the pickoff system, and a preadjustment of the cutout mechanism is performed by setting a predefined cutout distance, the bimetallic strips is then acted upon by a specific current.

It is an object of the present invention to improve the conventional adjustment method so that the specified response limits can be adhered to while taking into account individual deflections, with no necessity for repeat tests and thus for the time-consuming cooldown to ambient temperature.

The first object is achieved, according to the present invention, in that the cutout distance is dimensioned such that after the bimetallic strips have deflected as a result of the current load for a predefined time, the cutout mechanism does not yet cut out at the end of that time, but rather a residual cutout distance Ay is present, which at the end of the time is reduced to zero, i.e. until the cutout mechanism cuts out, by an apparatus.

DETAILED DESCRIPTION OF THE INVENTION

Figure 2:
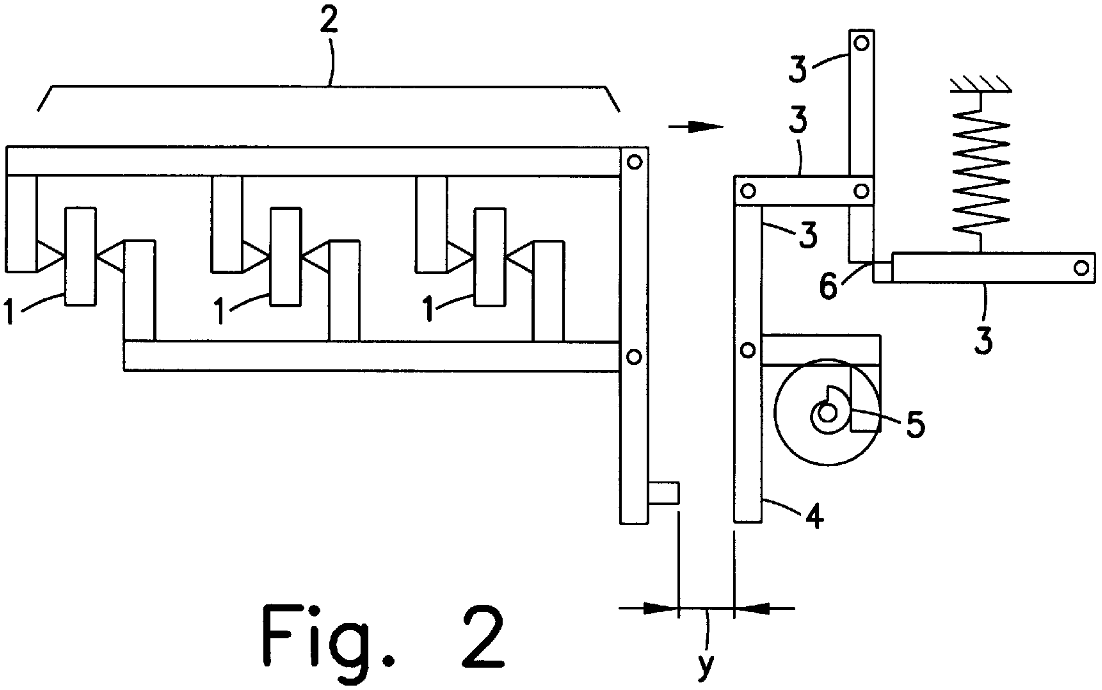
Fig. 2 PRIOR ART
FIG. 2 shows a schematic sketch of a conventional overload cutout.

The present invention is explained with reference to a conventional overload cutout shown in FIG. 2.

Figure 1:
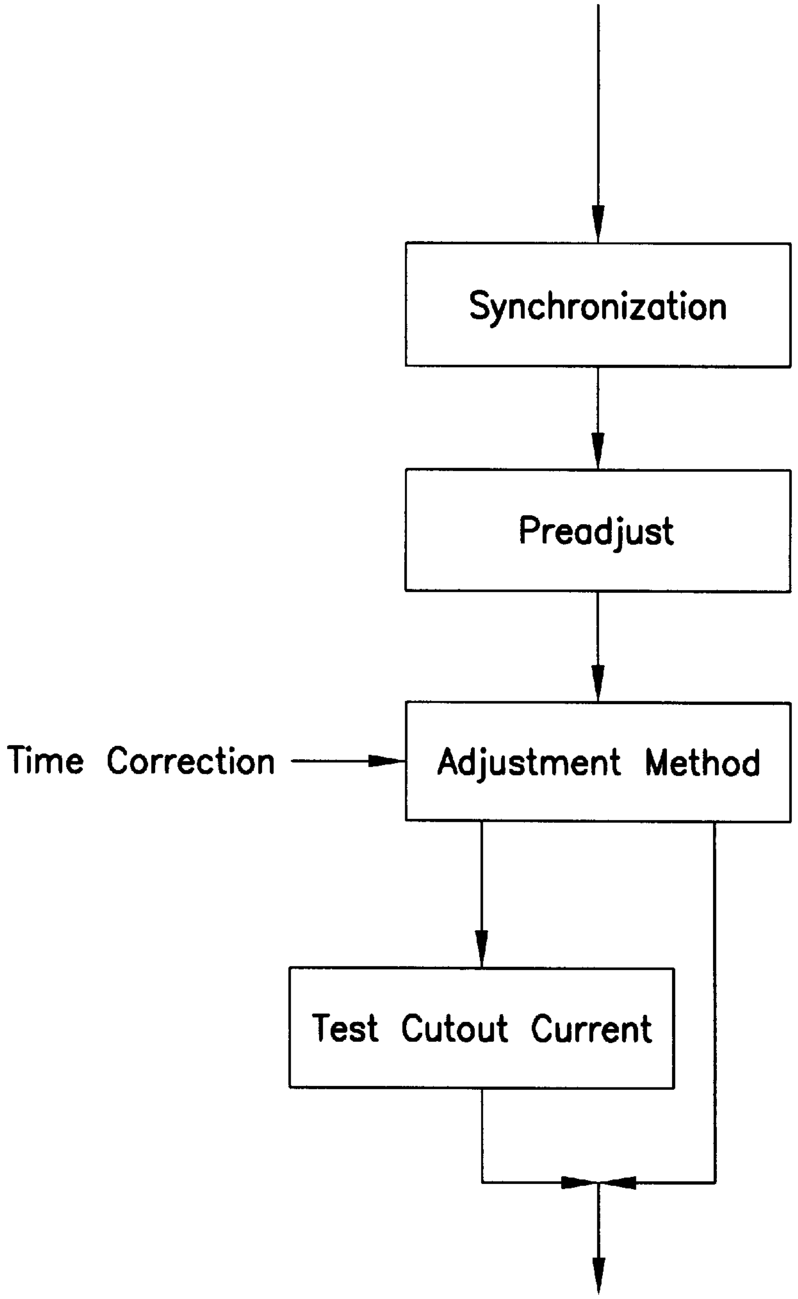
FIG. 1 shows a flow chart illustrating an adjustment method for a thermal overload cutout according to the present invention.
Figure 3:
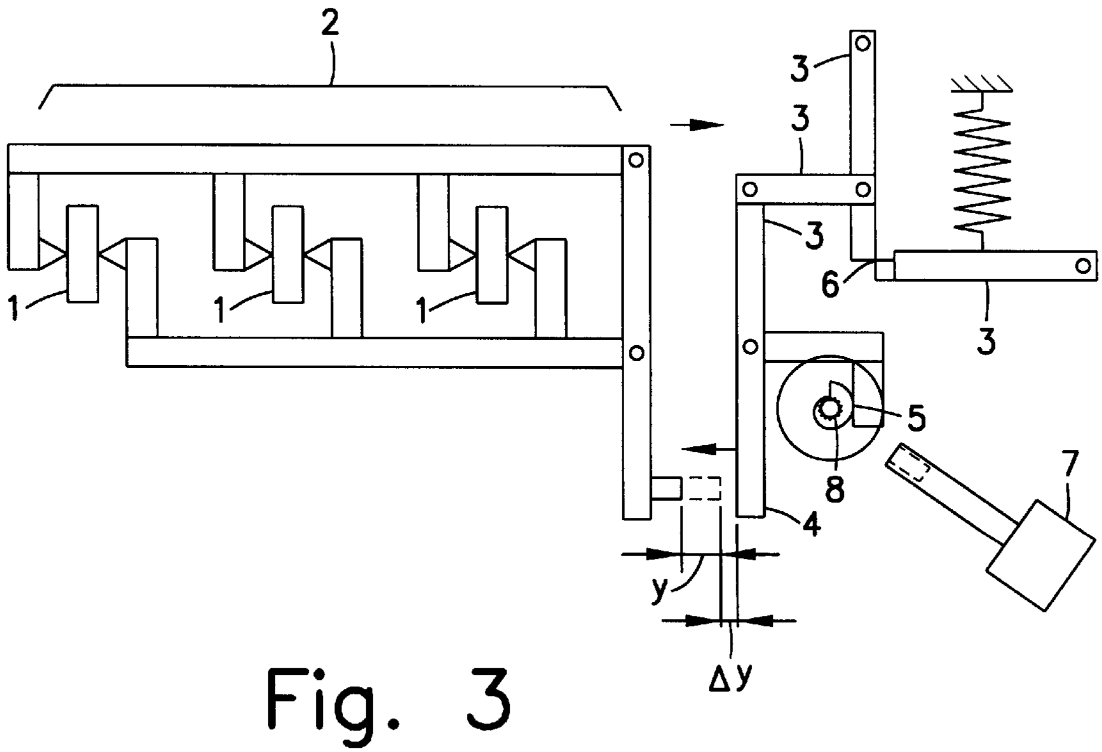
FIG. 3 shows an apparatus having a drive system for adjustment according to the present invention.

With the adjustment method according to the present invention, for which a flow chart is reproduced in FIG. 1, first the individual bimetallic strips 1 are matched with close tolerances to mechanical pickoff system 2 (synchronization). During the subsequent preadjustment process, a defined initial state is established, with a specific cutout distance from the actual adjustment procedure. Adjustment of the thermal overload cutout is usually performed when the latter is already installed in the protective device. Bimetallic strips 1 are then subjected to a current load, all the terminals of the protective device being connected in series. In the process, bimetallic strips 1 are acted upon for a predefined time T by a current which is a multiple of the preset or measurement current. At the end of the current load time T, there exists between mechanical system 2 with bimetallic strips 1, and cutout mechanism 3, a residual cutout distance $\Delta y$ which is reduced, by an apparatus 7 having a drive system as shown in FIG. 3, to zero and thus to the point of cutout. The entire mechanical system 2 and bimetallic strips 1 are thus incorporated into the adjustment procedure. The individual tolerances of the protective devices are thereby taken into account. The individual deflection of bimetallic strips 1 is simulated by the deflection of bimetallic strips 1 in the direction of the arrow during the current load time T.

Apparatus 7 as shown in FIG. 3 has, in order to reduce residual cutout distance $\Delta y$, a drive system, e.g. a stepping motor or a linear motor, which can be brought into mechanical engagement with cutout mechanism 3 via coupling means 8 on adjustment device 5 of cutout mechanism 3. The drive system is matched in terms of its speed to the expected values of residual distance $\Delta y$, in such a way that on the one hand the latter can rapidly be reduced to zero; and rapid deceleration to zero speed must be ensured at the moment at which cutout occurs and the rotation angle error can be corrected. This means that when mechanical shutoff point 6 is reached, the drive system must come to a halt with as little delay as possible and in defined fashion. The drive system can, for example, be coupled to adjustment device 5 via a gear 8 constituting the coupling means.

In order to guarantee response limits within specifications, randomly sampled measurements of the response limits are once again performed. If the results show a trend toward a change in the response limits, the latter are corrected toward the middle of the specified response limits by changing the current load time during the adjustment procedure.

The adjustment method is applicable to all devices having thermal overload cutouts which convert current in proportional fashion and cause it to act on a mechanical system.

What is claimed is:

1. A method for adjusting thermal overload cutouts, the thermal overload cutouts including bimetallic strips, a pickoff system and a cutout mechanism, the cutout mechanism including an adjustment device, the method comprising the steps of:

matching a first position of the bimetallic strips to a second position of the pickoff system;

preadjusting the cutout mechanism by setting a cutout distance to a predetermined distance;

applying a predetermined current load to the bimetallic strips for a predetermined time period to deflect the bimetallic strips, the cutout mechanism not cutting out at an end of the predetermined time period and a residual cutout distance being provided at the end of the predetermined time period; and reducing the residual cutout distance at the end of the predetermined time period to zero with an apparatus using the adjustment device.

2. The method according to claim 1, wherein the apparatus includes a drive system.

3. The method according to claim 1, further comprising the step of:

effecting a travel using the apparatus to reduce the residual cutout distance to zero so that the cutout occurs.

4. The method according to claim 2, further comprising the step of:

matching a drive system as a function of a speed and an inertia to the residual cutout distance to reduce the residual cutout distance to zero in a rapid manner and to decelerate the drive system in a rapid matter when the cutout occurs.

* * * * *